United States Patent

Cato et al.

[11] Patent Number: 5,539,394
[45] Date of Patent: Jul. 23, 1996

[54] TIME DIVISION MULTIPLEXED BATCH MODE ITEM IDENTIFICATION SYSTEM

[75] Inventors: Robert T. Cato; Richard H. Harris, both of Raleigh; Hollis P. Posey, Cary, all of N.C.

[73] Assignee: International Business Machines Corporation, Armonk, N.Y.

[21] Appl. No.: 493,847

[22] Filed: Jun. 20, 1995

Related U.S. Application Data

[63] Continuation of Ser. No. 214,716, Mar. 16, 1994, abandoned.

[51] Int. Cl.⁶ .............................. H04Q 7/00; G06F 7/04; G08B 13/14
[52] U.S. Cl. .............................. 340/825.54; 340/825.35; 340/572
[58] Field of Search .................. 340/825.35, 825.54, 340/825.71, 825.72, 825.73, 825.74, 572, 508

[56] References Cited

U.S. PATENT DOCUMENTS

| | | |
|---|---|---|
| 4,471,345 | 9/1984 | Barrett, Jr. .............................. 340/572 |
| 4,506,360 | 3/1985 | Kryskow, Jr. et al. |
| 4,575,719 | 3/1986 | Bertagna et al. |
| 5,043,722 | 8/1991 | Aggers et al. .................. 340/825.54 |
| 5,055,659 | 10/1991 | Hendrick et al. .................. 340/825.54 |
| 5,231,273 | 7/1993 | Caswell et al. .................. 340/825.54 |
| 5,235,326 | 8/1993 | Beigel et al. .................. 340/825.54 |
| 5,257,011 | 10/1993 | Beigel .................. 340/825.54 |
| 5,340,969 | 8/1994 | Cox. |

*Primary Examiner*—Alyssa H. Bowler
*Assistant Examiner*—Mark H. Rinehart
*Attorney, Agent, or Firm*—John D. Flynn; Joscelyn G. Cockburn

[57] ABSTRACT

Apparatus and method are disclosed for communicating between a central location and a plurality of identification tags or labels located in a container or in a space without separately passing each tag or labeled product through a read station. The disclosure includes use of hashing to reduce the amount of time needed to read the possible tags in the space. Reading is accomplished using radio communication with a combination of broadcast and time division multiplex architectures.

20 Claims, 5 Drawing Sheets

TIME DIVISION MULTIPLEXED BATCH MODE ITEM IDENTIFICATION SYSTEM

This application is a continuation of U.S. Ser. No. 08/214,716, filed Mar. 16, 1994, now abandoned, entitled "TIME DIVISION MULTIPLEXED BATCH MODE ITEM IDENTIFICATION SYSTEM", assigned to the same assignee as this patent application.

BACKGROUND OF THE INVENTION

1. Field of the Invention

This invention relates to reading a plurality of identification tags or labels in a container or space without separately passing each tag through a read station. This invention has particularly useful application in conjunction with cash registers and cash recorders, particularly those which determine the price by scanning or in some way interrogating a coded label on products such as consumer goods and which maintain inventory records. This invention also relates to reading such information using invisible radiant energy in the form of a radio transponder that is realized with integrated circuits fabricated on a monolithic semiconductor chip.

2. Prior Art

It is known in the art of food, clothing, and consumer goods distribution to provide a point of sale or checkout station near the exit of a store in order to allow the identification tags or labels on each of the items of merchandise selected by customers to be read, prices tallied, payment made and inventory counts adjusted. At such checkout stations, each item must be individually removed from a shopping cart or basket and moved past a reader in order to read the stock keeping unit information in the form of the universal product code (UPC) from the label.

U.S. Pat. No. 4,862,160 teaches an inventory data acquisition system where each item of inventory has a tag containing a small passive resonate transponder in the form of a printed circuit. A computerized transceiver mounted on a wheeled cart is moved through the aisles, and the transceiver generates signals causing tags which resonate at a unique pair of frequencies to re-radiate simultaneously a third frequency to which the receiver portion of the transceiver on the cart is tuned. The amplitude of the third frequency detected by the receiver portion is a function of distance and the number of tagged products present on the shelf or rack. With the system of this reference, the accuracy of the number of items is thereby compromised by distance and antenna pattern. Furthermore, the transceiver will have to generate all possible combinations of frequencies in order to interrogate all possible items of inventory such as would be required when the inventory is removed from the shelf by a customer and placed in a shopping basket. Unlike inventory data collection, the items in a shopping basket cannot be predicted at a point of sale.

Because a large retail enterprise may have millions of different items for sale with millions of different stock keeping units, it is not practical to serially interrogate each possible stock keeping unit to determine whether it is present.

U.S. Pat. No. 3,832,530 relates to apparatus for identifying articles such as a suitcase or a mailbag. The objects are moved one at a time through an electromagnetic field. Circuits on the label are powered by the electromagnetic field to change the states of a chain of flip flops on the label in a predetermined fashion thereby absorbing electromagnetic energy in a predetermined pattern. The pattern of electromagnetic energy absorption is sensed and then decoded. The chain of flip flops may be set for different codes. The teachings of this reference do not handle multiple items to be sensed in the read region at the same time and do not allow one or more of a plurality of items to be individually addressed and requested to store data. Further, this prior art technique requires a magnetic shielded box which is expensive and inconvenient.

U.S. Pat. No. 4,471,345 describes a tag and portal system for monitoring the whereabouts of, for example, people wearing the tags. Up to six tags may be simultaneously interrogated as their holders pass through a doorway. The tags respond to interrogation signals generated by the portal and their response occurs after a pseudorandom delay. The pseudorandom delay is used to avoid data collisions by the six responding tags.

SUMMARY OF THE INVENTION

An advantage of the invention described herein is that the apparatus and method of the invention will read the information in a large number of identification tags that are in close proximity to one another, in an efficient manner.

Another advantage is that the tags do not require line-of-sight communication linkage to the reader.

A further advantage is that the tags do not need to be presented to the reader individually so handling of the items to enable reading is essentially eliminated.

In the preferred embodiment, prior knowledge of the possible identities of the tags to be read is not required. For example, the identification tags on each bottle of spice in a shipping crate can be interrogated individually using this invention. Likewise, all the items in a shopping cart can be identified and individually interrogated with out removing them from the cart. Other applications, including reading tags on wildlife in a feeding area, reading debit cards, and detailed product data, and further applications which have not been identified are possible.

These and other advantages of the invention are accomplished using the tags and reading devices which communicate with each other using radiation. The communication protocol architecture includes a combination of broadcast and time division multiplexing that utilizes a hashing algorithm to select the transmission time slot. Once the reader learns the identity of the tags in the read volume, it can address communications to the individual tags.

Each tag contains non-volatile memory. Data will be added or modified by a reader anytime during the life of the item the tag is attached to, making the tags a form of a data base. Tags are powered by a battery or by radiation from the reader or by any other convenient means.

In the preferred embodiment, tags are manufactured in the form of semiconductor chips. Large numbers of identification tags will be manufactured on an automated assembly line, and the tags are later personalized by storing unique identification data in each tag. Initial personalization will be done at either the manufacturing site or at a site where they are attached to the item to be identified.

In one application of the invention, the reader requests responses from only a fraction of the tags in the read volume. This is done by command from the reader that requires certain fields in the tags' data base to contain particular data in order for the tag to respond to the reader. The reader, for example, could request a response from only the black ski gloves that are present. The data fields contained in the response would also be controlled by the reader; they may or may not contain the fields used to qualify for responding.

Multiple items with the same Universal Product Code could be individually identified using a serial number for each item. In this embodiment, multiple identical (except for serial numbers) packages of bread will be identified by different stock keeping units comprising the UPC and serial numbers.

DESCRIPTION OF THE PREFERRED EMBODIMENT

Figure 1:
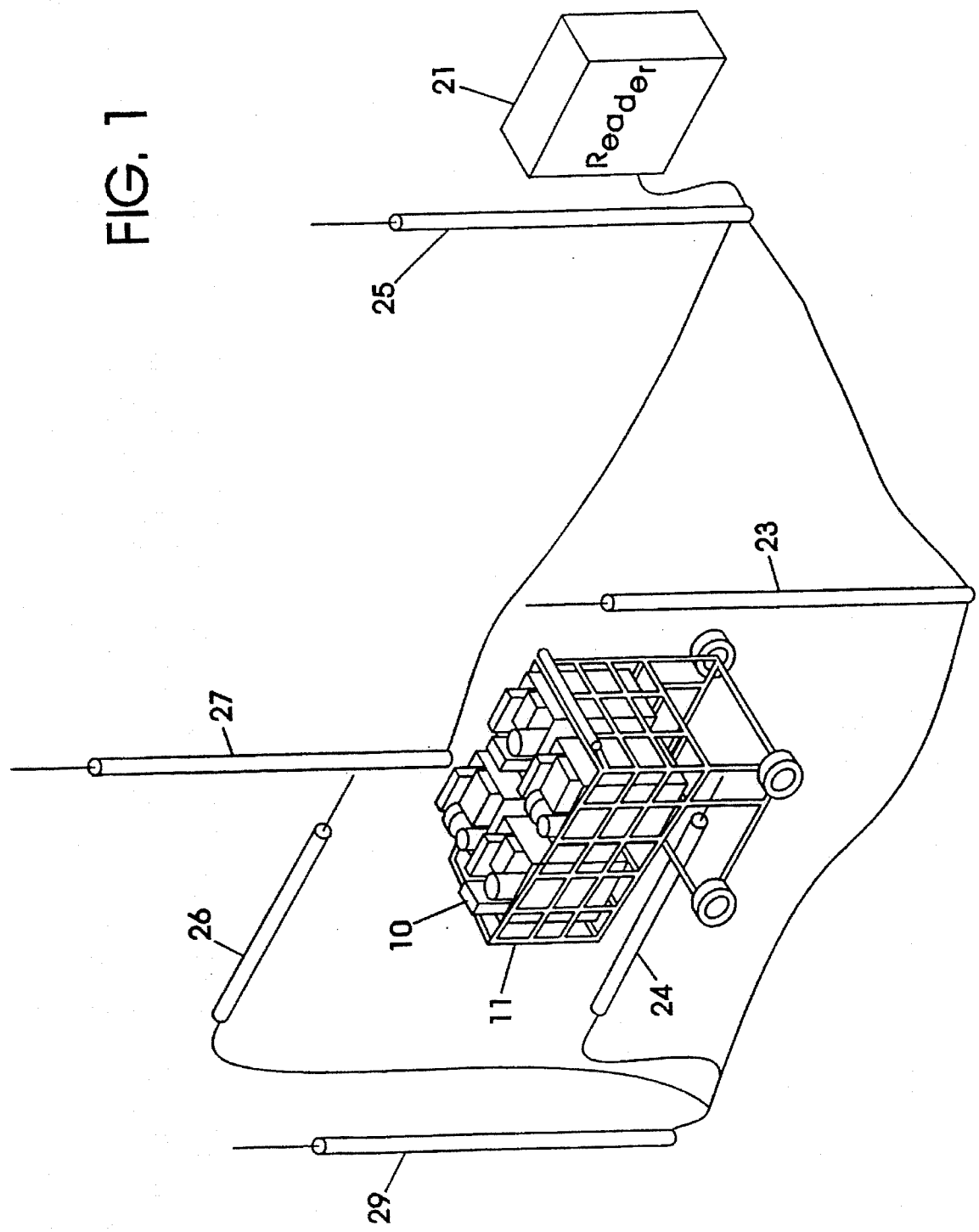
FIG. 1 is a perspective view of a shopping cart, the contents of which are being read in accordance with the invention.

Features of the invention are accomplished by the reader first broadcasting a set of parameters to all the tags in the read volume. The broadcast initiates a series of time slots with which the reader and the tags get synchronized. Each tag uses the broadcast parameters, their unique identity, and/or some or all the data they contain to calculate a time slot in which it will communicate with the reader. The parameters transmitted from the reader to the tags can be, but are not limited to, a hashing base number (which is the same as the number of time slots), a data field selector, a hashing algorithm identifier, and a command. The individual tag's time slot selection calculation is done based on a hashing algorithm.

The length and number of time slots are either predefined at the time of tag manufacture or are defined in the information transmitted from the reader. The time slot sequence starts at the end of the reader's broadcast. The number of time slots is selected to be greater than the number of tags anticipated to be in the read volume at one time.

The reader transmits an individual acknowledgement (ACK) to all the tags who successfully communicated with the reader. The ACK conditions the tag in a manner that removes it from participation in subsequent read operations until reenablement.

In the event that more than one tag chooses the same time slot, a collision occurs and no tag's communication successfully reaches the reader. No ACK will be transmitted from the reader to the colliding tags. Another read cycle will be initiated by the reader with another hashing base number used by the tags, resulting in the tags using different time slots. This process is repeated until all the tags' communication is successful. (There are no more collisions and a read cycle reads no new tags.)

The key elements for operating on identifying data are the data fields, data encoding, the hashing algorithm, and the hashing parameters.

For maximum flexibility of application to various business operations, maintenance of multiple data fields and selection of the field to be used as the identifier is desirable. Where the identification of an item type and item serial number is the focus for sales checkout operation used throughout this document four illustration, other fields of data my be transmitted. For example, data such as a purchase order number and purchase order item number might be the fields of interest at a receiving dock. During transit, way bill numbers might be selected for controlling responses.

Efficient hashing operation during read cycles requires matching the algorithm to the encoding of information and selecting the proper randomizing divisor for the sample universe. An algorithm designed for a binary field does not necessarily efficiently use available bandwidth when applied to an ASCII encoded field, for example. Control of the hashing base number allows trade-offs among read cycle times, the number of potentially stocked items in the store, and the number of items in a read batch. Therefore, the preferred embodiment allows for flexibility in these areas.

FIG. 1 shows a cart 11 packed with four different bags full of items. Each item has a tag 10 affixed to it. These tags are read by reader 21 via radio communication using antennas 23, 24, 25, 26, 27 and 29. The antennas provide a read volume within which the cart is placed for reading. By reading the entire cart full of items, the need to remove each item from the cart and pass it over a scanner or through a read volume has been eliminated.

Figure 2:
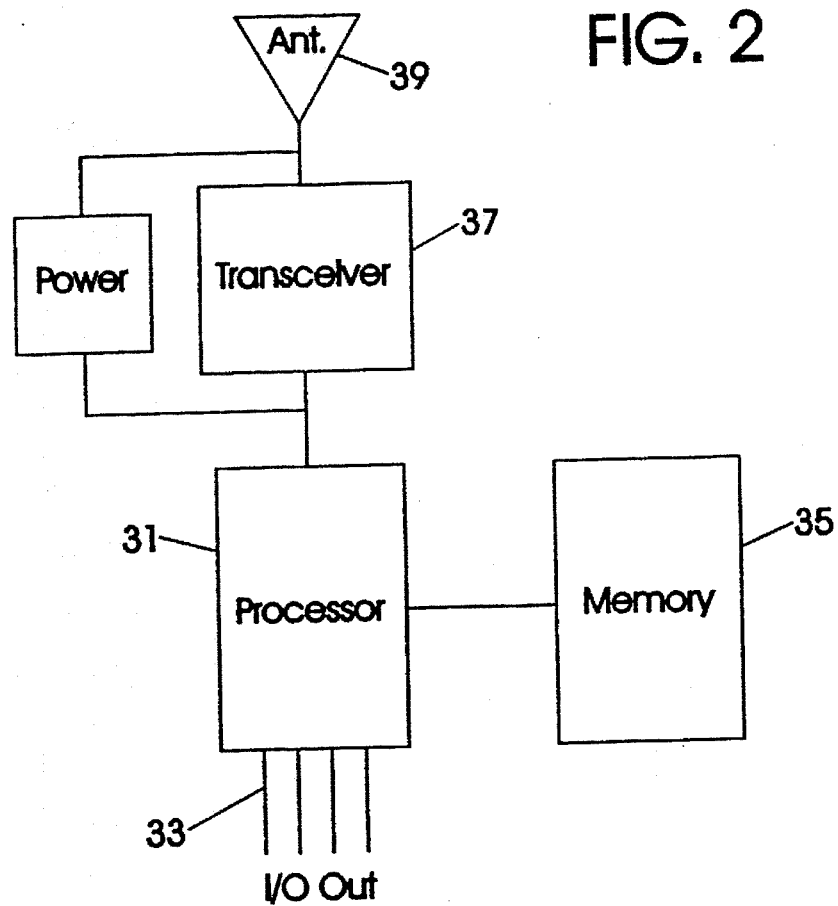
FIG. 2 is a block diagram of the circuits of the reader of FIG. 1.

Referring now to FIG. 2, a block diagram showing the electronic circuits of reader 21 is set forth. A processor 31 has input/output connections 33 which are connected to printers and coin changers, etc. making up a point of sale station. The processor 31 has a memory 35 to store information and programs. A transceiver 37 is also connected to processor 31 to transmit and receive radio frequency signals through antenna 39. Antenna 39 comprises the individual antennas 23, 25, 27, 29 and antennas above and below cart 26 and 24 shown in FIG. 1. The reader does not require the RF rectifier or battery represented by the power block. The block diagram of the tag is the same as FIG. 2, but the tag has no I/O out lines.

Figure 3:
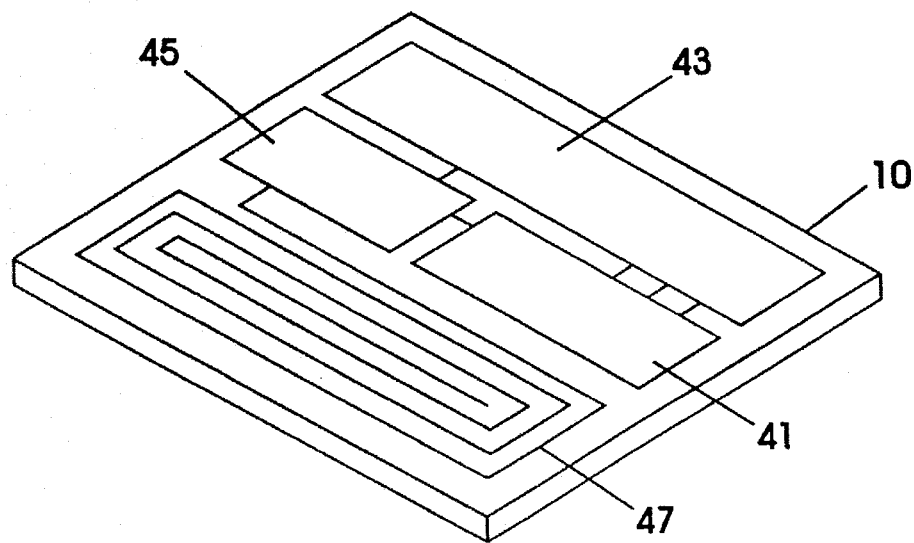
FIG. 3 is a perspective view of a product identification chip.

Referring now to FIG. 3, a perspective view of an example of a tag in the form of a monolithic identification chip 10 is shown. The chip 10 has a processor 41 which is connected to a memory 43. Memory 43 is either a ferroelectric, a Flash, or an EEPROM memory. A power supply and transceiver 45 is connected to both the memory 43 and the processor 41 to provide power to both of those circuits as well as to send and receive information from and to the processor 41. An antenna 47 is connected to transceiver 45. The antenna receives energy via radio waves from antenna 39 of the reader in FIG. 2 to provide an alternative to having a battery power the processor memory and transceiver electronic circuits as well as receiving and transmitting information in a predetermined band. Each chip 10 shown in FIG. 3 transmits and receives using radio frequencies with a range determined by application, but typically 6–12 feet for check-out at point of sale.

Figure 5:
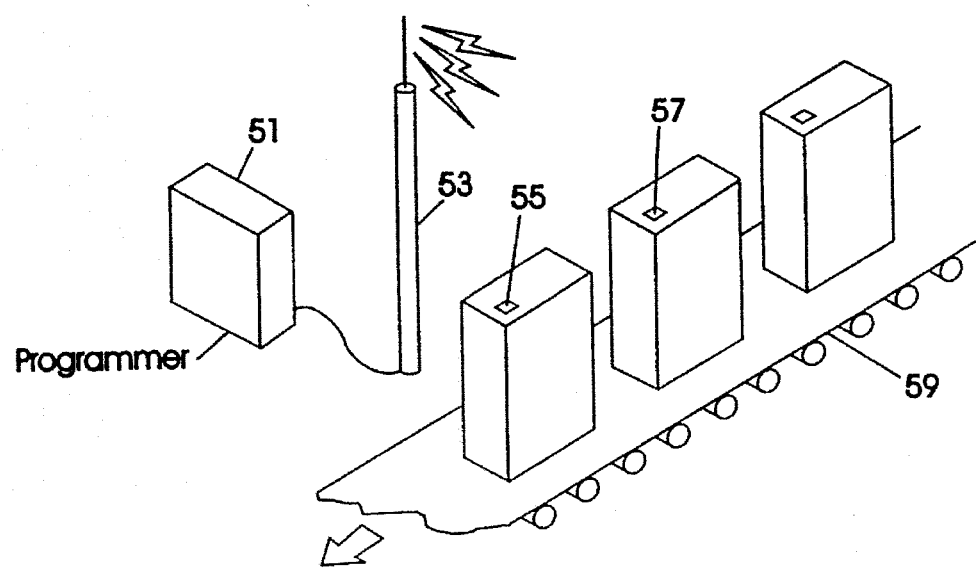
FIG. 5 is a diagram showing how the tags may be programmed with product identity.

FIG. 5 shows a programmer 51 which transmits signals through antenna 53 to individual tags 55 and 57 which are sequentially passed near antenna 53 on a conveyer 59 to receive their initial identity and product data. Because tags 57 have not yet been programmed, they can not use the time division multiplex feature of the invention at this stage but must communicate one at a time. In this embodiment, the tags have already been attached to the item.

Programmer 51 has a processor similar to the processor shown as 31 in FIG. 2, a memory similar to memory 35, a transceiver similar to transceiver 37 and the antenna 53 is similar to antenna 39 but may be a single antenna as shown in FIG. 5. As each tag moves past the programmer 51, it is provided with the UPC or other data of the type of item and other data such as run number, date code, and serial number of, for example, a container of cinnamon spice. The programmer then loads each tag 55, 57, etc. with the same UPC which identifies the item type. In addition to the code number, the programmer 51 loads each tag with a different or unique serial number. The UPC and the serial number are loaded into memory 43 shown in FIG. 3 after having been received by antenna 47 and been processed through transceiver 45 and processor 41. Since the type of item passing the programmer is known, the loading of the tags 10 is not complex and is done in accordance with the techniques of the prior art known in radio communication and computing.

Method of Operation of the Invention

Figure 4:
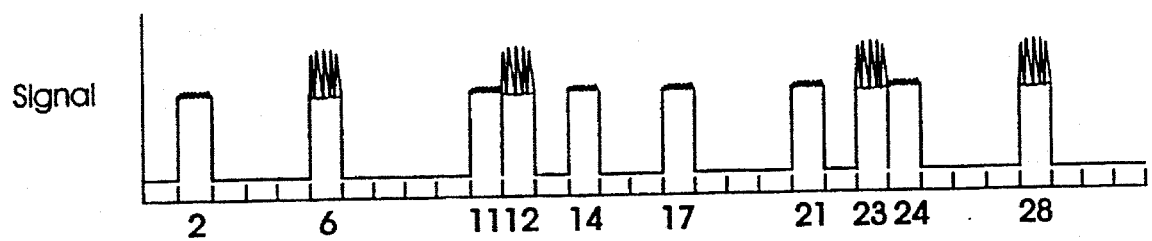
FIG. 4 is a timing chart showing the signals being read from a plurality of tags.
Figure 6:
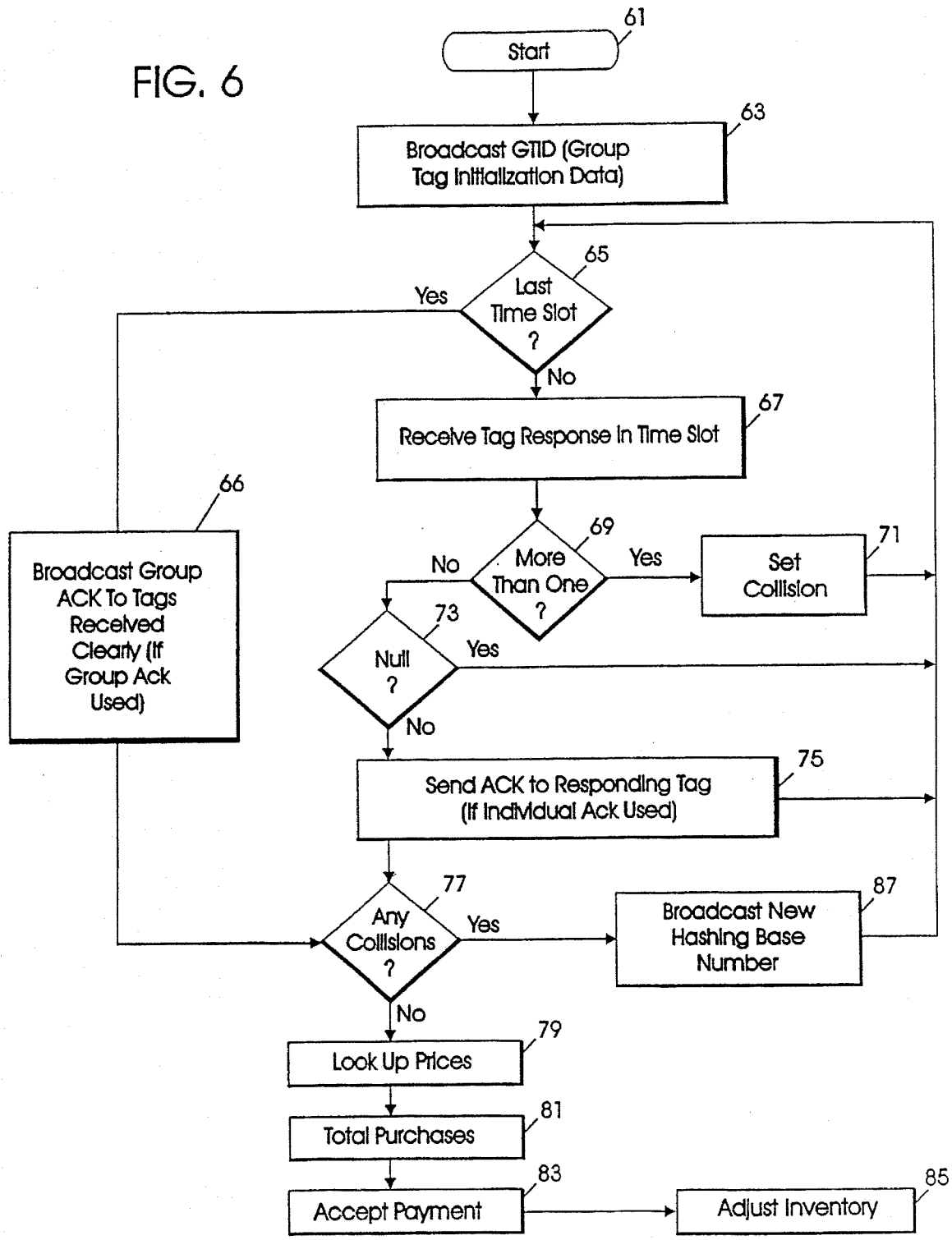
FIG. 6 is a flow diagram of the operation of a reader.
Figure 7:
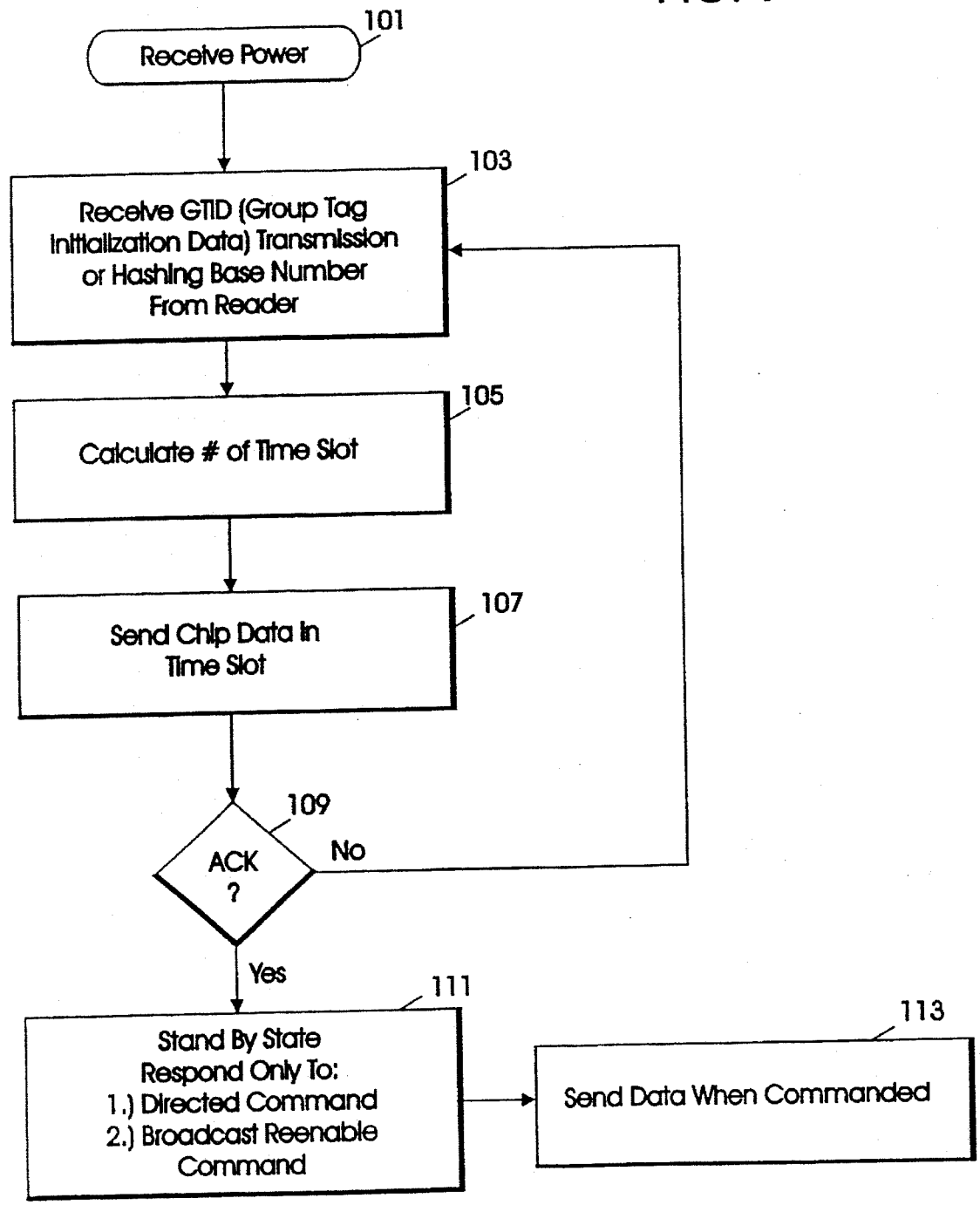
FIG. 7 is a flow diagram of the operation of a tag.

Referring now to FIGS. 4, 6, and 7, the method of reading a plurality of tags will be described. Each tag is powered by a battery or by radio frequency signals transmitted from the antenna 39 of FIG. 2, received by antenna 47 of FIG. 3 and converted in transceiver power circuits 45 into direct current voltages needed by each processor 41 and memory 43 in each tag in cart 11.

The reader starts to interrogate the tags in the read volume by first transmitting a set of operational parameters called Group Tag Initialization Data (GTID). The GTID consists of the hashing algorithm selector, the hashing base number (matches the number of time slots), the data field selector, and a command. The commands control such things as whether the tag should respond based on one field of data but actually transmit data from a different field. A command can also cause tags that had previously responded to a reader to respond to a new read cycle and/or to reset any status conditions it is storing.

The hashing algorithm causes the tags to group themselves by time slots. The tags with the same time slot (hashed number) transmit simultaneously to the reader. Memory 43 of each chip contains several hashing algorithms in computer program form. In extended embodiments of the invention, it is possible to define a command to be used by the reader to enable it to load a new hashing algorithm into any tags that can receive the reader's signal.

In the example of this embodiment, the selected algorithm hashes a field in the tags memory 43. In this embodiment, the tag's identification serial number is divided by a divisor (the hashing base number) to produce a remainder (the hashed number) which corresponds to the communication time slot in which the tag will transmit. Note that the hashing base number equals the member of time slots used.

Hashing algorithms are well known for their ability to distribute data over a defined range of numerical values. If the original data is truly random, then the hashed numbers will be evenly distributed over the range of numbers defined by the hashing base number. However, data is frequently not truly random, such as data stored in ASCII format. In order to distribute nonrandom data smoothly, the hashing algorithm must match the nature of the data. Thus the necessity to vary the hashing algorithm used.

Since the entire population of tags existing locally (in a store, for example) far exceeds the hashing base number (number of time slots), some items will wind up with the same hashed number. For example, a store with 3 million items could be using a hashing base number of 30,000. This would result in each hashed number being used by 100 items.

Only a small subset of the entire population of tags (a filled shopping cart, for example) will be in the read volume at one time. The probability of two tags in the read volume transmitting in the same time slot (having the same hashed number) is low. This probability goes up with the number of tags being interrogated at once. Since the probability of a randomly chosen item using a particular hashed number is so low, a large number of tags could be read at one time and the system would not have to deal with excessive cases of tags using the same time slot which would result in collisions.

If a tag's communication is successful in reaching the reader, the reader will then know to address an ACK to that tag. When the tag receives the ACK from the reader, the tag then knows that its message was received by the reader and that the reader is aware of the tag's presence. The tag will not transmit again until it is specifically requested to do so by the reader.

If two tags use the same time slot to transmit, the reader will detect a collision by the absence of a clear transmission. A collision will cause the data to be garbled. When the reader does not receive a clear transmission it does not send an ACK. If a tag does not receive an ACK to its transmission, it will retransmit on a succeeding read cycle. The reader will repeat read cycles until no collisions are detected and no successful communication from tags are received.

The invention contemplates any of several methods for transmitting the acknowledgements. Three example methods are: ack at the end of each time slot, use the next time slot cycle as an ack cycle, or transmit a group ack at the end of the time slot cycle. The number of time slots required to transmit the acks is much smaller than the total number required to receive the identities of the tags; therefore, it requires less time to transmit acks. The group ack would not be in the format of a time slot cycle, but would be single packet containing the ID's of the tags successfully heard from.

Before a tag retransmits after a collision on the next time slot cycle, it either receives a new base number or it calculates a new hashed number that is based on a hashing base number that is 1 less than the hashing base previously used. This is enough to avoid a large percentage of hashed number collisions. Alternatively, the reader would down load a new hashing base number into the unread tags. The reader knows which previous hashing numbers resulted in collisions and will use an intelligent algorithm to set the new hashing base number.

By the time the second read time slot cycle comes around, most of the tags will have been read and the unread tags will have chosen new, probably non-colliding time slots. The probability of two unread tags choosing the same hashed number again is small. The number of tags read in the second cycle will be smaller than in the first, so the odds of a collision will be drastically smaller.

If, despite low odds, two tags' messages collide during the second read time slot cycle, a third cycle is initiated. Of course new hashed numbers will be calculated as described above. This cycle can be repeated, but the probability of another cycle being required drops drastically with each cycle.

The number of time slots in a cycle affects how fast the reader must respond to the individual time slots. Even if a time slot is allowed for all 30,000 UPC label types in a typical store, it would mean that each time slot would be 33 microseconds long if the total cycle time is 1 second. It is not unreasonable to allow a 10 second cycle time, thus allowing 330 microseconds per time slot. With inexpensive processors having instruction times of around 1 microsecond, it is reasonable to have a microprocessor/specialized hardware or multiple microprocessor design perform satisfactorily.

The timing chart of FIG. 4 shows a number of time slots one through twenty-eight and beyond on the x axis. Each signal level is shown in the y direction. Time slots one, three, four and five have no signal in them indicating null information. Null information means that there are no tags in the shopping cart corresponding to universal product code and serial numbers that would result in a hashed number designating these time slots.

Time slots two and six do show signals being transmitted from one or more tags to the reader. In time slots two, eleven, fourteen, seventeen, twenty-one, and twenty-four, a clean signal is shown representing the identification information from only one tag. The signals in time slots six, twelve, twenty-three and twenty-eight, on the other hand, show a collision indicating that more than one tag is transmitting in these time slots which will be detected as collisions.

Attention is now directed to FIG. 6 where a flow diagram is set forth showing the method of operation of the reader as it is controlled by programs stored therein.

Operation of the reader begins at start block 61 which may be initiated by a checkout person pressing a start button or it may be initiated when the shopping cart is moved into the read volume shown in FIG. 1. During the start operation, programmed instructions from storage 35 are executed in processor 31 to control the communications modem 37 to transmit a GTID command to any and all tags within the read volume of FIG. 1. Broadcast transmission of the GTID command performs multiple functions. First, it provides a radio frequency signal that can be received by the antenna 47 of all tags and converted into power within the chips to bring the tags into operation. In addition, the GTID command, when received by each tag acts to initialize the tag and put all tags into synchronization with the reader. This operation is shown in FIG. 6 at block 63. The GTID contains the hashing base number, which is used by the tag in combination with the specified data fields of the tag. This may include the universal product code and serial number of the item to which the chip is attached to generate a remainder (hashed number) which identifies the time slot in which the tag transmits its identity to the reader. The execution of the program in the processor of the reader remains synchronized with such communication and, therefore, keeps track of which time slot is being received. Such synchronous operation appears in FIG. 6 as decision block 65. At decision block 65, the program determines whether the current time slot is the last time slot which could be created using the previously broadcast hashing base number. So long as the last time slot has not passed, the antenna 39 and modem 37 of the reader will attempt to receive tag data in the then current time slot as represented in the timing chart of FIG. 4 and by block 67 in FIG. 6.

Signal discrimination program instructions from storage 35 execute in processor 31 to discriminate between null, clear and collision signals. Such discrimination is represented in the flow diagram of FIG. 6 by decision blocks 69 and 73. If more than one response has been received, the response will be garbled and the output from decision block 69 sets collision detected state 71 shown in FIG. 6. Once a collision has been detected in a time slot, the program flow returns to decision block 65 to await the next time slot. If more than one response has not been received, the possibility exits that there has been a null response or a clear response from a single tag. This decision is detected at block 73 where a yes output leads directly back to time slot decision block 65 because a null indicates that no tag has transmitted in the time slot. A no output from block 73 indicates that a clear signal has been received from only one tag which will be acknowledged at block 75.

The transmission of an acknowledgement to a clearly responding tag can be within the same time slot wherein the tag is transmitting or it can be at the end of all time slots. If the ack is transmitted within the same time slot, it will be presumed that the acknowledgement is transmitted immediately in the latter portion of the same time slot. The acknowledgement is transmitted specifically to a tag identified by its tag universal product code or other specified field, and serial number and the acknowledgement message could also include a new slot number. The new slot number is the slot in which future transmissions from the tag to the reader will be expected by the reader.

After detecting responses and acknowledging clear responses, the program flow returns to decision block 65 and the loop is repeated until the last time slot has been received. The yes output from decision block 65 leads to block 66 which, if group ack are used, broadcasts a group ack to all the tags successfully heard from. The group ack packet would have a broadcast address and send the addresses of the tags which successfully communicated as data. The occurrence of any collisions during the previous series of time slots is determined by block 77. If no collisions occurred, that means that all tags in the cart have clearly transmitted their identity to the reader one tag at a time, each in a single time slot and the program flow can continue to blocks 79, 81, 83 and 85 to look up each of the prices for each of the items, total the purchase amount, accept payment for the transaction and adjust any inventory records to reflect sale of the quantity and type of item contained in the cart. The tag identification information may be used to identify the product to which the related tag was attached by accessing storage to retrieve product information and price information. This storage may be part of the reader or stored in the identification tag itself.

In the event that a collision was detected, the collision means that there still remain items in the cart whose label tags have not yet been able to clearly transmit their identity to the reader. In this case, the flow of FIG. 6 follows the yes path to block 87 where a new hashing base number is broadcast to all tags. Those tags which have already received an acknowledge transmission do not act on the new hashing base number. Only those tags which have had no acknowledgement and whose programs are therefore in a state indicating that they have not yet clearly transmitted, act on the new hashing base number to combine it with the specified fields to define a new time slot. After new time slots have been defined, the remaining tags are still in synchronism with the reader and at block 65 the cycle repeats in order to read the remaining tags. This process continues until, as previously described, all tags have been read as indicated by the detection of no collisions.

As previously mentioned with respect to block 75 of FIG. 6, there are a number of ways that the acknowledgement can be transmitted to the tag. In addition to transmitting in the same time slot as previously described, acknowledgements can be made at the end of each sequence of time slots by sending a group acknowledge command followed by the identity of each tag whose signal was clearly received alone in a time slot. This is done in block 66. In this way all tags whose signal was clearly received will be provided with information to be used by the tag to store a state causing that tag not to retransmit during the next sequence of time slots based on the new hashing base number.

Referring now to FIG. 7, the program flow of the operation of each tag 10 is set forth in flow diagram format. Each tag receives power at its antenna 47 or from a battery. This state is represented in FIG. 7 at block 101. The tag is synchronized with the reader at block 101 by recognition of the GTID command at block 103. The hashing base number is used at block 105 when the program stored in storage 43 executes in processor 41 to calculate the number of the time slot wherein this tag will transmit response information to the reader. After calculating its own time slot, the tag will count time slots until its time slot occurs as set forth graphically in the timing chart of FIG. 4. When the time slot of this particular tag occurs, this tag sends its data by broadcast transmission to the reader as depicted in block 107 of FIG. 7. If the tag receives an acknowledgement from the reader, the tag enters a standby state and no longer has to calculate further time slots and retransmit its identification data because the program in effect knows that the reader has received its data, clearly alone, in a time slot.

Since the reader 21 is now aware of the identity of the tag, it can later address a command to the tag at block 111 to receive from the tag any other data at 113 which is stored therein. The delta may include price, product expiration date or other information relevant to the item to which this tag is attached.

If at decision block 109, the program of the tag determines that no acknowledgement has been received, the tag goes into a wait state until it receives from the reader another hashing base number at block 103. Alternately, the tag can calculate a new hashing base number. Thereafter, this tag repeats this cycle of operations at blocks 103,105, 107 and 109 until it has received an acknowledgement.

While the invention has been described with respect to a preferred embodiment including the application of the invention in a store having a checkout station and having a plurality of items in stock to which tags have been attached, it will be recognized that various changes in application and detailed implementation may be made without departing from the spirit and scope of the invention which is to allow acquisition of information from a plurality of sources without the need to pass each through a reader in sequence. For example, the invention may find utility in the monitoring of wildlife to which tags have been applied. Wildlife within a feeding area thereafter may be identified from time to time and thereby learn the feeding or other habits of the wildlife without interfering in their environment in order to collect the data. Future tags' data fields could be made large enough for passenger information, patient information or instruction manuals.

Examples of variations in the detailed implementation are the inclusion of a battery on each tag so that power need not be received or the use of functional logic on each tag instead of a sequential processor and stored program as described in the preferred embodiment. Tags may be implemented in multiple components or a single chip.

Another variation could be the use of a method that indirectly detects collisions by the absence of a clear signal reaching the reader from a tag. Either no transmission from any tag or colliding transmissions from multiple tags could prevent a clear signal from reaching the reader. Collision resolution could be done simply by repeating read cycles until no clear message is received several consecutive times, changing the hashing base each read cycle. With a relatively small number of extra read cycles, the probability of multiple tags repeatedly colliding in the same time slot would be extremely small. This would effectively eliminate the risk of not reading a tag.

Accordingly, it will be recognized that these and other modifications may be made without departing from the scope of the invention as measured by the following claims.

What is claimed is:

1. A method of reading a plurality of identification tags in a read volume, each tag having a chip, each chip having data storage, logic and communication circuits said storage containing tag identification information comprising the steps of:

1) broadcasting a start command to all of said tags, said start command indicating to said tags that their tag identification information needs to be transmitted;

2) broadcasting a hashing base number to all of said tags from which each tag, to which it has been indicated that their tag identification information needs to be transmitted, use the hashing base number, said tag identification information and a hashing algorithm to determine which of a plurality of time slots to transmit said tag identification information;

3) receiving null and tag identification information transmitted by said tags in the plurality of time slots;

4) detecting a collision state when a plurality of tags transmit tag identification information in a single time slot;

5) detecting a clear signal state when tag identification information from only one tag is received in a time slot;

6) transmitting clear signal acknowledgment information to those tags which transmitted tag identification information in a time slot in which no other tag transmitted, said acknowledgment information indicating to said those tags that their tag identification information need not be retransmitted;

7) repeating steps 2, 3, 4, 5, and 6 using a newly generated hashing base number for each iteration, as the hashing base number until a collision state is not detected; and 8) processing the received tag identification information.

2. The method of claim 1 wherein step 8 includes the steps of:

1) using the tag identification information to identify the product to which the related tag was attached by accessing storage to retrieve product information and price information;

2) tabulating total purchases;

3) accepting payment; and 4) adjusting inventory records.

3. The method of claim 2 wherein said storage is physically located on said related tag and step 1 of claim 2 further comprises the steps of:

1) transmitting a read storage command to said related tag; and 2) receiving from said tag, product information and price related information of the product to which said related tag is attached.

4. The method of claim 1 wherein step 6 further comprises the steps of:

1) transmitting a receive acknowledgement command to all of said tags, said receive acknowledgement command defining the start of a new set of time slots and 2) transmitting tag identification information to a tag for which a clear signal was detected in a unique time slot of said new set of time slots, said unique time slot being the time slot in which later communication may be conducted with said tag.

5. The method of claim 4 wherein said processing step 8 of claim 1 further comprises:
   1) broadcasting a group read product data command to all of said tags:
   2) receiving product information and price information from said tag in said unique time slot described in step 2 of claim 4
   3) receiving product information and price information from others of said tags in other time slots of said new set of time slots;
   4) tabulating total purchases;
   5) accepting payment, and
   6) adjusting inventory records.

6. The method of conveying data from a tag, said tag having data storage, logic and communication circuits said storage containing tag identification information comprising the steps of:
   1) receiving a start command;
   2) receiving a hashing base number;
   3) hashing said hashing base number with said tag's tag identification information to identify a time slot;
   4) transmitting said tag identification information in said identified time slot, and
   5) repeating steps 2, 3 and 4 until a clear signal acknowledgement containing said tag identification information is received.

7. The method of claim 6 further comprising the steps of:
   1) receiving a read storage command;
   2) transmitting from said tag, product information and price information of the product to which said tag is attached.

8. Apparatus for reading a plurality of identification tags, each tag having data storage, logic and communication circuits, said apparatus comprising:
   communication means for transmitting signals to and receiving signals from said plurality of tags;
   processor means connected to said communication means and to a storage means;
   said processor executing programs stored in said storage means and processing data including data stored in said storage means;
   said programs including a broadcast start command means for broadcasting a start command to all of said tags;
   said programs including first programmed means for broadcasting a hashing base number to all of said tags;
   said programs including second programmed means for receiving null and tag data in a plurality of time slots;
   said programs including third programmed means for detecting a collision state when a plurality of tags transmit tag data in a single time slot;
   said programs including fourth programmed means for detecting a clear signal state when tag data from only one tag is received in a time slot;
   said programs including fifth programmed means for transmitting clear signal acknowledgement information to those tags which transmitted tag data in a time slot in which no other tag transmitted, said acknowledgement information indicating to said those tags that their tag data need not be retransmitted;
   said programs including a programmed control means for reactivating said second, third, fourth and fifth programmed means until a collision state is not detected;
   said programs including programmed transaction processing means for processing said received tag data.

9. The apparatus of claim 8 wherein said programmed transaction means further comprises:
   storage access means responsive to said tag data to identify the product to which the related tag was attached by accessing storage to retrieve product information and price information;
   summing means for tabulating total purchases;
   means for accepting payment, and
   means for updating inventory records.

10. The apparatus of claim 9 wherein said storage is physically located on said related tag and said storage access means further comprises:
    means for controlling said communication means to transmit a read storage command to said related tag;
    means for controlling said communication means to receive from said tag, product information and information of the product to which said related tag is attached.

11. The apparatus of claim 8 wherein said fifth programmed means further comprises:
    means for controlling said communication means to transmit a receive acknowledgement command to all of said tags, said receive acknowledgement command defining the start of a new set of time slots;
    means for controlling said communication means to transmit tag identification information to a tag for which a clear signal was detected in a unique time slot of said new set of time slots, said unique time slot being the time slot in which later communication may be conducted with said tag.

12. The method of claim 11 wherein said programmed transaction processing means further comprises:
    programmed means for controlling said communication means to broadcast a read product data command to all of said tags:
    programmed means for controlling said communication means to receive product information and price information from said tag in said unique time slot;
    programmed means for controlling said communication means to receive product information and price information from others of said tags in other time slots of said new set of time slots;
    programmed means for controlling said processor means to tabulate total purchases;
    programmed means for controlling said processor means to accept payment, and
    programmed means for controlling said processor means to adjust inventory records.

13. An identification tag comprising:
    data storage;
    logic connected to said data storage;
    communication circuits connected to said logic;
    said logic including first means for responding to a start command;
    said logic including second means for responding to a hashing base number;

said logic including third means for calculating a time slot using said hashing base number, a hashing algorithm and data from said storage means;

said logic including fourth means for controlling said communication circuits to transmit data in said time slot;

said logic including fifth means for receiving an acknowledgement;

said acknowledgement indicating to said tag that its data need not be retransmitted, and said logic including control means for reactivating said second, third, fourth and fifth means until an acknowledgement is received.

14. The apparatus of claim 13 wherein said data storage means includes storage for product information and price information, said control means being responsive to a read command to control said communication means to transmit said information.

15. The apparatus of claim 13 wherein said fifth means further comprises:

means for controlling said communication means to receive a receive acknowledgement command, said receive acknowledgement command defining the start of a new set of time slots; and said logic further comprises sixth means responsive to said acknowledgement command to receive data in a unique time slot of said new set of time slots, said unique time slot being the time slot in which later communication may be conducted with said tag.

16. The method of claim 1 wherein step 6 said acknowledgement information contains tag identification information for those tags which transmitted tag identification information in a time slot in which no other tag transmitted.

17. The apparatus of claim 8 wherein said tag data includes tag identification information and said clear signal information transmitted by said fifth programmed means includes tag identification data for those tags which transmitted tag data in a time slot in which no other tag transmitted.

18. The method of claim 1 wherein step 1 the start command provides identification of the hashing algorithm that is used to determine the time slot in which to transmit.

19. A method of reading a plurality of identification tags at a Point of Sale checkout counter, each tag associated with an item to be purchased, each tag having a chip, each chip having data storage, logic and communication circuits said storage containing tag identification information comprising the steps of:

1) broadcasting a start command and a hashing base number to all of said tags, said start command indicating to said tags that their tag identification information needs to be transmitted;

2) hashing, in each tag to which it has been indicated that their tag identification information is to be transmitted, using the hashing base number and the tag identification information to determine which of a plurality of time slots to transmit said tag identification information;

3) receiving null and tag identification information transmitted by said tags in the plurality of time slots;

4) detecting a collision state when a plurality of tags transmit tag identification information in a single time slot;

5) detecting a clear signal state when tag identification information from only one tag is received in a time slot;

6) transmitting clear signal acknowledgment information to those tags which transmitted tag identification information in a time slot in which no other tag transmitted, said acknowledgment information indicating to said those tags that their tag identification information need not be transmitted;

7) repeating steps 2, 3, 4, 5, and 6 with a newly generated hashing base number as the hashing base number in each iteration, until a collision state is not detected; and 8) processing the received tag identification information.

20. The method of claim 19 wherein said newly generated hashing base number is generated from said broadcast hashing base number in each of the tags.

* * * * *